United States Patent [19]

Anderson

[11] 4,331,956
[45] May 25, 1982

[54] CONTROL MEANS FOR A SOLID STATE CROSSBAR SWITCH

[76] Inventor: Alan M. Lovelace, Administrator of the National Aeronautics and Space Administration, with respect to an invention of Tage O. Anderson, Arcadia, Calif.

[21] Appl. No.: 191,744

[22] Filed: Sep. 29, 1980

[51] Int. Cl.³ .......................... H04Q 9/00; H04Q 3/42
[52] U.S. Cl. ........................... 340/825.89; 179/18 GF; 370/67
[58] Field of Search ....................... 340/825.8, 825.89; 179/18 GF; 370/67

[56] References Cited

U.S. PATENT DOCUMENTS

| | | | |
|---|---|---|---|
| 4,024,352 | 5/1977 | Mukaemachi et al. | 340/825.89 |
| 4,075,608 | 2/1978 | Koenig | 340/825.8 |
| 4,095,055 | 6/1978 | Gotoh et al. | 179/18 GF |

Primary Examiner—Donald J. Yusko

Attorney, Agent, or Firm—Paul F. McCaul; John R. Manning

[57] ABSTRACT

A control system for a solid state crossbar switch (10) which allows a plurality of switch control and interrogation functions to be implemented by time sharing related circuitry. The crossbar switch (10) includes a plurality of X ports ($X_1$-$X_N$) and Y ports ($Y_1$-$Y_M$), each X-Y port intersection designating a specific X-Y intersection latch which controls a plurality of associated switches for interconnecting one set of data lines associated with the X port to another set of data lines associated with the Y port. The control system disclosed continuously and sequentially addresses each of the X-Y intersection latches at a 10 megahertz rate. During this continual and sequential addressing, the control circuitry disclosed includes a capability for interrogating each intersection latch for determining which are in a set condition, ensuring that only one X-Y intersection latch is set on an X row and Y column defining that latch, resetting all of the X-Y intersection latches, and determining which of the X-Y intersection latches are in a set condition.

6 Claims, 4 Drawing Figures 4,331,956

CONTROL MEANS FOR A SOLID STATE CROSSBAR SWITCH

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

TECHNICAL FIELD

The invention relates to control systems for solid state crossbar switches, and more particularly to systems wherein control is time shared between a plurality of configuration and interrogation functions.

BACKGROUND ART

Switches for connecting computers and various peripheral devices such as control terminals, display terminals, time generators, line printers, magnetic tapes, magnetic discs, and the like are well known in the communication arts. Typical switching requirements for communications systems require that a plurality of lines associated with one device be interconnected to a plurality of lines associated with another device, these lines generally being of the type that carry parallel, digital data either in binary or BCD format. A typical crossbar switching matrix includes a plurality of X ports and a plurality of Y ports. Each port has a plurality of associated lines. Each X-Y port intersection has an associated X-Y intersection or control latch and a plurality of associated switching planes so that all the lines associated with the X port and the Y port defining the X-Y intersection latch are interconnected.

Prior art switches for effecting this type of switching have been generally mechanical, large in size, costly, and require elaborate control circuitry. Attempts have been made to design solid state switches using back-to-back connections of moderately efficient digital multiplexer and demultiplexer circuits. For bi-directional traffic, each set had to be duplicated. Such switches show little improvement over mechanical switches, the improvement gain being mostly derived from the fact that the return wire for a signal wire need not be switched as the signal was reconstituted electronically. In mechanical switches, the return wire needs to be switched in order to maintain ground integrity.

As a result of recent developments in analog switching arrays with memory and digital control circuits, it has become feasible to design large switching matrices using solid state circuitry. However, as the number of lines to be switched increases, control circuitry and status determination circuitry for the switching matrix has become increasingly complex. The control system disclosed herein solves many of the above problems by providing relatively simple control circuitry that accomplishes a plurality of related control functions through time sharing of various control elements.

STATEMENT OF THE INVENTION

The invention provides a control system for a solid state crossbar switch having X rows and Y columns and Z switching planes, each X-Y intersection including an intersection latch for simultaneously controlling corresponding latches in each of the Z switching planes. The control system includes a first means for continually and sequentially accessing each of the X-Y intersection latches, a second means responsive to the first means for determining which of the intersection latches are in a set condition, a third means responsive to the first means for insuring that only one X-Y intersection latch in an X row and Y column defining a predetermined X-Y intersection latch is in a set condition, and a fourth means responsive to the first means for resetting each of the X-Y intersection latches.

In the specific embodiment disclosed, a $16 \times 24 \times 16$ solid state crossbar switch having 16 X ports, 24 Y ports and 16 Z switching planes are controlled by circuitry including an X counter and a Y counter that continually and sequentially accesses each of the X-Y intersection latches. A display means is included so that the status of each intersection latch is displayed simultaneously with the accessing of each intersection latch. A set-reset capability is also disclosed that allows each of the X-Y intersection latches to be reset upon generation of an appropriate reset signal each time the intersection latch is accessed.

BEST MODE FOR CARRYING OUT THE INVENTION

Detailed illustrative embodiments of the invention disclosed herein exemplify the invention and are currently considered to be the best embodiments for such purposes. They are provided by way of illustration and not limitation of the invention. Various modifications thereof will occur to those skilled in the art, and such modifications are within the scope of the claims which define the present invention.

As previously explained, a system is disclosed for controlling a solid state crossbar switch that is time-shared between five different functions. In an exemplary embodiment, a $16 \times 24 \times 16$ crossbar switch is chosen, the first two numbers being the number of X and Y input ports and the last number being the number of signal lines associated with each of the input ports. Connection of the lines associated with one of the X ports and the lines associated with one of the Y ports is effected by X-Y intersection latches, one latch being provided for each X-Y port combination for each line. Five functions are shared by the disclosed control circuitry, these functions including (1) addressing each X-Y intersection latch, (2) interrogating of a special status plane for determining which latches are in a set condition, (3) ensuring that only one X-Y intersection latch is set on an X row and Y column defining that latch, (4) resetting all of the intersection latches, and (5) determining which of the X-Y intersection latches are in a set configuration. Basically, the X-Y intersection latches define a switching plane that is divided into X rows and Y columns, each row and column corresponding to an associated port. As will be explained in further detail below, the X-Y intersection latches are divided into addressable groups of latches, and a control means is provided that allows each group of latches to be addressed and then specific latches within the addressed group to be addressed. The control system continually and sequentially addresses each latch, and various control and interrogation functions are effected as the latches are being sequentially addressed. In the exemplary embodiment, the intersection latches are interrogated at a 10 megahertz rate which results in each latch being addressed every 38.4 microseconds.

Figure 1:
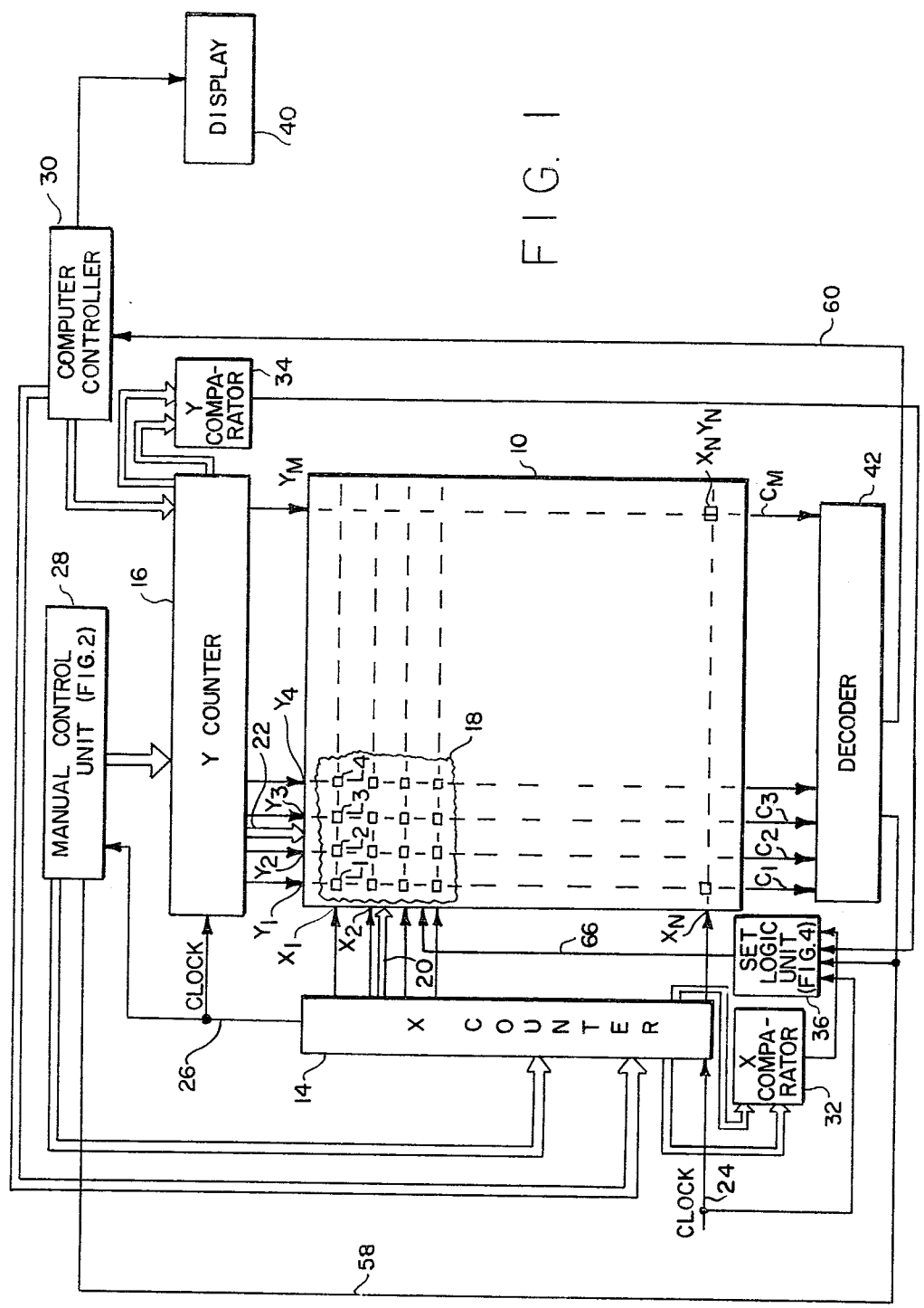
FIG. 1 is a block diagram of the crossbar switch and associated control circuits.

Referring to FIG. 1, a solid state crossbar switch 10 is shown which includes a plurality of X ports, $X_1$ through $X_N$, and plurality of Y ports, $Y_1$ through $Y_M$, where N equals sixteen and M equals twenty four. Each input port is connected to an appropriate X-Y intersection latch associated with its corresponding row or column. For example, the $X_1$ input port is connected to all of the latches lying on the $X_1$ row, i.e., latches $L_1$, $L_2$, $L_3$ and so forth. Similarly, each of the Y input ports are connected to latches lying on the column defined by that Y port. Although not shown in FIG. 1, each of these latches L control a plurality of switches lying in switching planes controlling each latch. Thus, latch $L_1$ when set causes sixteen lines associated with the $X_1$ port to be connected to sixteen lines associated with the $Y_1$ port. Also, if latch $L_3$ is also set, the same sixteen lines associated with the $X_1$ port are also connected to the sixteen lines associated with the $Y_3$ port. In addition, an X counter 14 and a Y counter 16 are provided. The crossbar switch 10 is divided into a plurality of 4 by 4 analog switch matrices 18 which are commercially available, one of them being an RCA 22100 model. Each switch matrix is addressed by the X and Y counters 14 and 16 via address lines 20 and 22. Thus, when X-Y intersection latch $L_4$ in the first switch matrix 18 is to be addressed, the X counter 14 via address lines 20 addresses the first switch matrix 18 and the Y counter via address lines 22 also addresses the first switch matrix 18. Then the first line corresponding to the $X_1$ port and the fourth line corresponding to the $Y_4$ port is activated, thereby addressing latch $L_4$. Timing is provided by a clock signal via a first clock line 24, the clock signal being provided to the Y counter 16 via a second clock line 26. A manual control unit 28 is provided for configuring the switch control system. A computer controller 30 which can be utilized in lieu of the manual control unit 28 is also included. An X comparator 32 and Y comparator 34 are also provided for generating coincidence signals when a selected X-Y intersection latch is being addressed. A set logic unit 36 is provided for generating a set or reset signal at appropriate times. A computer-driven display 40 is provided for displaying certain parameters as will be explained below. A decoder 42 is provided for generating display information regarding the status of all X-Y intersection latches.

In operation, each intersection latch $X_1Y_1$ through $X_NY_M$ is sequentially addressed by the X and Y counters 14 and 16. The addressing in the exemplary embodiment is implemented so that each intersection latch lying along the $X_1$ row is sequentially addressed, then each intersection latch lying along the $X_2$ row is sequentially addressed, and so on. The addressing scheme is implemented so that the X counter 14 addresses the first matrix 18 and the Y counter addresses the first matrix 18 via address lines 20 and 22, respectively. The X counter 14 then provides a signal at the $X_1$ port and the Y counter 16 sequentially provides signals at the $Y_1$ through $Y_4$ ports, thereby addressing latches $L_1$ through $L_4$. The next matrix (not shown) is addressed and the sequence repeated until all of the latches associated with the first $X_1$ row have been addressed. Upon completion of the first row, the first matrix 18 is again addressed by the X counter 14 and the Y counter 16 and a signal provided at the $X_2$ port. The Y counter 16 again provides signals via the $Y_1$ through $Y_4$ ports. Each latch in the crossbar switch 10 is continually and sequentially addressed in this manner. As will be explained below, having addressed the various latches, a set or reset signal can be provided by the set logic unit 36 so that each addressed latch can be appropriately configured.

Figure 2:
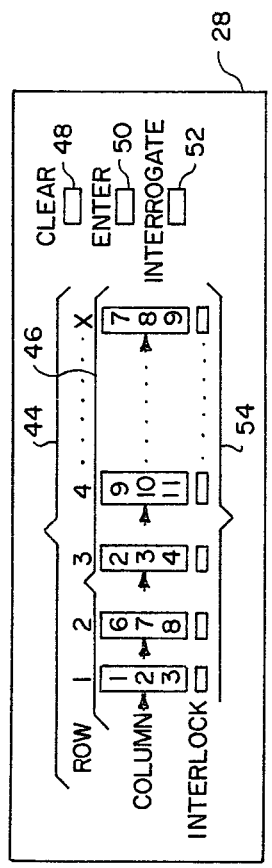
FIG. 2 shows a front panel of the manual control unit.

As previously explained, the control system for the crossbar switch 10 allows five different functions to be implemented on a time shared basis by the same control circuitry. These functions include addressing each X-Y intersection latch, interrogating each intersection latch for determining and displaying which are in a set condition, ensuring that only one X-Y intersection latch is set on an X row and Y column defining that latch, resetting all the intersection latches, and determining for computer read out which of the X-Y intersection latches are in a set condition. Referring now to FIG. 2, the face of the manual control unit 28 can be seen. Here, the various rows are labeled as shown at 44 and thumbwheel switches for the columns to be connected to their associated rows are shown at 46. Additionally, a clear switch 48, enter switch 50, interrogate switch 52 and a plurality of interlock switches shown at 54 are included.

Operation of the manual control unit 28 is as follows. Depression of the clear switch 48 results in each of the X-Y intersection latches being placed in a reset condition, thereby ensuring that none of the lines associated with the X ports are connected to lines associated with the Y ports. Whenever a connection to be made between lines associated with an X port and a Y port are desired, the thumbwheel associated with the desired X port row is set to the desired Y port column. For example, in the configuration shown in FIG. 2 X row 1 is connected to Y column 2, X row 2 to Y column 7 and so forth. Once a desired connection is selected, depression of the enter switch 50 results in the appropriate X-Y intersection latch being placed in a set configuration the next time it is addressed. If it is desired to connect the first row to both Y column 2 and column 3, the thumbwheel is first set to two and the enter switch 50 depressed, and then set to three and the enter switch 50 again depressed, thereby connecting the first X row to both columns two and three. As will be explained below, depression of the interrogate switch 52 will result in a display showing which of the X-Y intersection latches are in a set condition, thereby indicating which of the X and Y ports are interconnected. Depression of one of the interlock switches 54 results in only the X-Y intersection latch defined by its associated thumbwheel being set. As previously explained, this is effected by resetting all the X-Y latches on the appropriate row and column, and then only setting the specifically designated X-Y intersection latch. For example, in FIG. 2 the first X row is to be connected to the second Y column. Depression of the associated interlock switch will result in every X-Y latch on the first X row and every X-Y latch on the second Y column being reset during one addressing cycle. Then the X-Y intersection latch associated with the first row and second column will be set on the next addressing cycle.

The interrogate function initiated by depression of the interrogate switch 52 will now be explained in reference to FIGS. 1 and 2. Depression of the interrogate switch 52 provides a signal to the decoder 42 via an interrogate line 58 which sets the decoder to receive inputs from the various column lines $C_1$, $C_2$ through $C_M$. When the first analog switch matrix 18 is addressed, the X counter 14 provides a signal at the $X_1$ port. If any of the latches $L_1$–$L_4$ are in a set condition, this signal is transferred to the appropriate column line $C_1$–$C_M$ and is provided as a signal to the decoder 42. For example, it latches $L_1$ and $L_3$ are in a set condition, then the signal provided on the input line to the $X_1$ port will be transferred to column lines $C_1$ and $C_3$. These signals are transferred via a decoder output line 60 to the computer controller 30 and then to the display 40. Thus, the condition of each of the intersection latches L is provided to the display 40, the display thus reflecting the actual configuration of the latches rather than a programmed or selected configuration.

Figure 3:
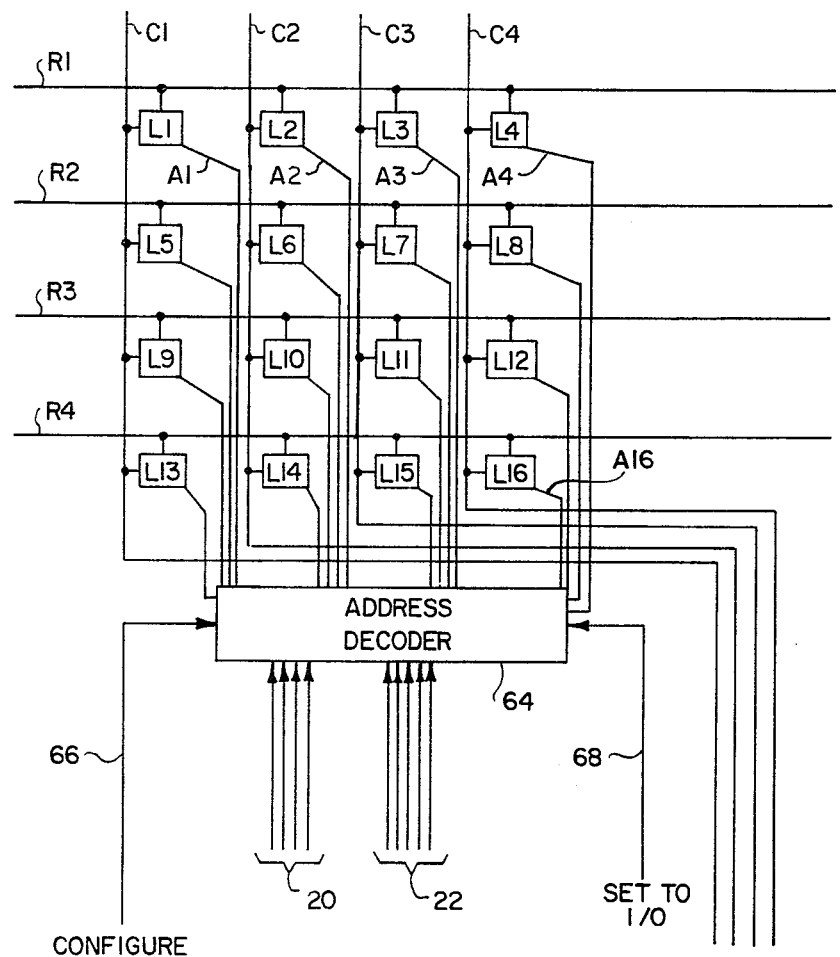
FIG. 3 is a block diagram of a portion of the crossbar switch shown in FIG. 1.

Details of one of the analog switch matrices 18 is shown in FIG. 3. Each of the latches $L_1$ through $L_{16}$ has three inputs, one being from its associated column line, one from its associated row line, and one from an address decoder 64. The address decoder 64 has as inputs the address lines 20 from the X counter 14 and the address lines 22 from the Y counter 16. Thus, for a 16 by 24 switch, four row address lines 20 and five column address lines 22 are required. When a particular latch addressed by the X counter 14 and Y counter 16 is to have its set or reset configuration changed, a signal generated as will be explained below appears on a configure line 66 which, through the decoder 42, allows access to the addressed latch via corresponding access line $A_1$ through $A_{16}$. Simultaneously with the configure line 66 allowing access, the appropriate set or reset signal is provided on a "set to 1/0" line 68. Thus in the absence of a signal on the configure line 66, the address decoder 64 when addressing each of the latches merely allows a signal on the row line to be coupled to the column line for display as previously explained.

Figure 4:
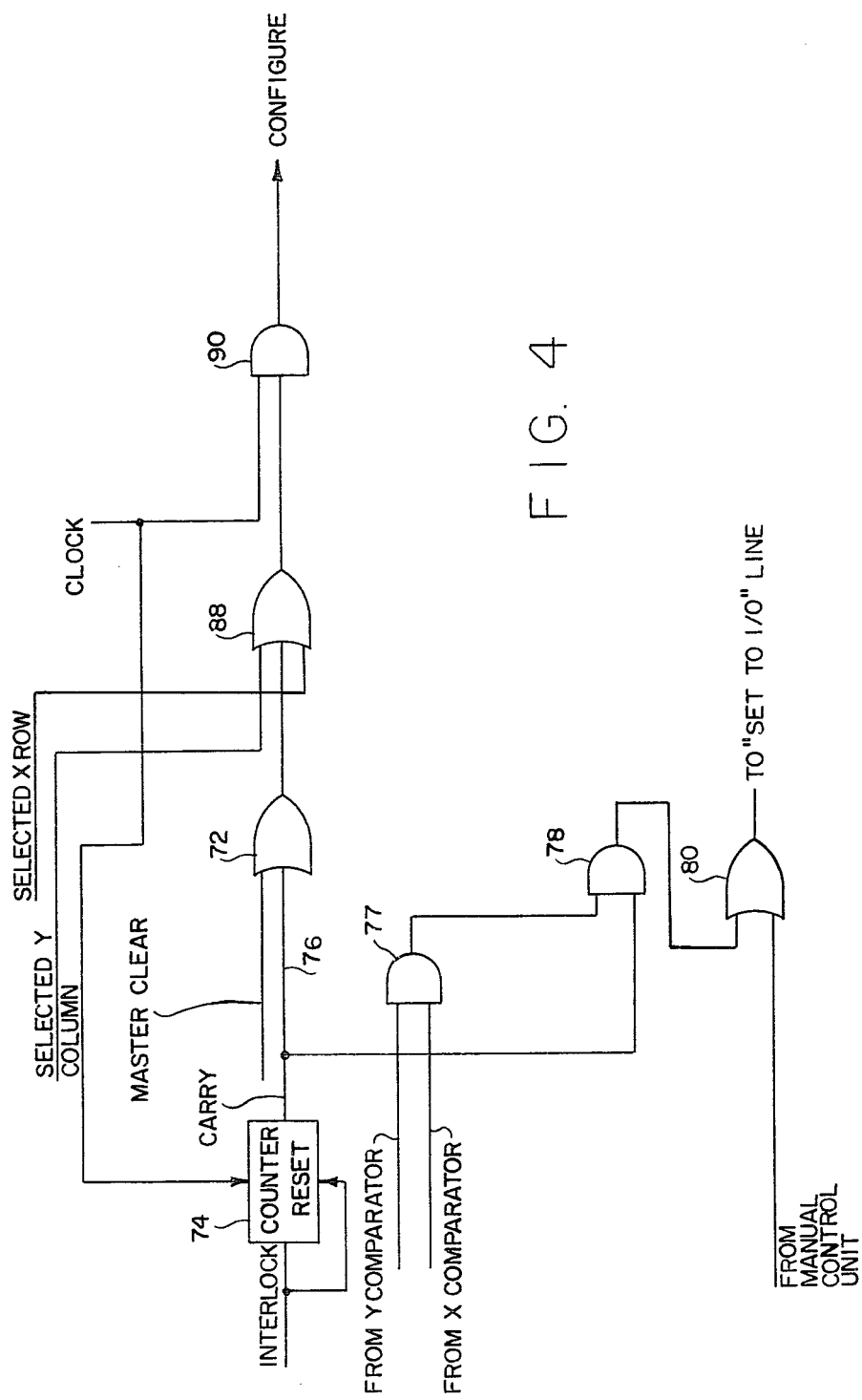
FIG. 4 is a block and logic diagram of the set logic unit shown in FIG. 1.

Understanding of the interlock and master clear functions can be best understood in reference to FIG. 4. Referring to FIG. 4, a first OR gate 72 has inputs from the master clear switch 48 in the manual control unit 28. The interlock signal from the manual control unit 28 is provided to a counter 74. Upon receipt of an interlock signal, the counter 74 is reset to zero and begins to count in response to the clock signal. The counter 74 is chosen so that its output or "carry" signal 76 becomes high after a count corresponding to the member X-Y intersection latches has been reached. The first OR gate 72 has inputs from the master clear switch 48 in the manual control unit 28 and from the counter 74. The interlock signal from the manual control unit 28 is provided to the counter 74. Upon receipt of the interlock signal, the counter 74 is reset to zero and begins to count in response to the clock signal. The counter 74 is chosen so that its output becomes high after a count corresponding to the total number of X-Y intersection latches in the switch 10 has been reached. This high signal is referred to as a "carry" signal and is provided to the first OR gate 72 via a carry line 76. A first AND gate 77 receives signals from the X and Y comparators 32 and 34, respectively. When both signals are high, i.e., when the X and Y ports being addressed correspond to a selected X port and a selected Y port, the first AND gate 77 output signal becomes high. This high signal and the "carry" signal are provided to a second AND gate 78, the output of which is provided to a second OR gate 80. A third OR gate 88 provides a high output signal whenever an intersection latch associated with a selected X row or a selected Y column is being addressed. This high output signal, through a third AND gate 90, provides a configure signal. Thus, when the output from the first AND gate 77 is high, and the output from the counter 74 is high, the output from a second AND gate 78 is high, thereby causing the second OR gate 80 to become high, thus generating a set signal to the "set to 1/0" line.

In operation, the master clear function works as follows. Depression of the master clear switch causes the output of the first OR gate 72 to become high, which in turn causes the output of the third OR gate 88 to become high. However, the "set to 1/0" signal provided at the output of the second OR gate 80 remains low. Under these circumstances, the clock signal provided to the third AND gate 90 causes a configure signal to be generated each time one of the intersection latches is accessed. This configure signal allows a zero on the "set to 1/0" line to reset each intersection latch, thereby breaking any connection between an X port and a Y port. If it is desired to set a specific X-Y intersection latch, the coordinates of the specific latch are provided to the X counter 14 and the Y counter 16 by either the manual control unit 28 or the computer controller 30 depending on whichever unit is being utilized to control switching. The desired X row is provided to the X comparator 32 and the desired Y column is provided to the Y comparator 34. Each X row addressed by the X counter 14 is also provided to the X comparator 32, and each Y column addressed by the Y counter 16 is provided to the Y comparator 34. When the desired and actual addresses are the same, the X and Y comparators 32 and 34 provide signals to the first AND gate 77, thus resulting in a high signal being provided by the second OR gate 80. This high signal from the second OR gate 80 causes the selected X-Y intersection latch to be set.

The interlock function is effected slightly differently in that when an interlock signal from the manual control unit 28 is received, it sets the counter 74 to zero. The counter is chosen so that after a number corresponding to the number of X-Y intersection latches has occurred subsequent to receipt of the interlock signal, a high signal is provided on the "carry" line 76. Prior to generation of the "carry" signal, a signal provided by the counter 14 to the third OR gate 88 corresponds to the X row designated by the manual control unit 28. Similarly, a signal provided by the Y counter 16 to the third OR gate 88 corresponds to the Y column designated by the manual control unit 28. Thus when in the interlock mode, as the X counter is addressing an X row containing the X-Y intersection latch of interest, a signal is provided to the third OR gate which results in a configure signal being generated by the third AND gate 90. This configure signal results in each of the X-Y intersection latches along the selected X row being reset because of a zero output signal from the second OR gate 80. Similarly, a signal is provided to the third OR gate which results in each of the X-Y intersection latches along the selected Y column also being reset because of a zero output signal from the selected OR gate 80. Thus, as the X and Y counters 14 and 16, respectively, go through the first addressing cycle prior to generation of the "carry" signal, each X-Y latch along the selected X row and selected Y column is reset to zero. After the counter 74 has been indexed by a sufficient number of clock pulses to insure that all of the X-Y intersection latches have been addressed, which in the exemplary embodiment would be 16×24 or 384 counts, the "carry" signal is generated on line 76. This signal results in a high output or configure pulse being generated for each clock pulse subsequent to appearance of the carry signal. When signals from the X comparator 32 and the Y comparator 34 occur which correspond to the selected X row and Y column, a high output signal from the first AND gate 77 and the second AND gate 78 provides a high signal through the second OR gate which results in the selected X-Y intersection latch being set, all the other X-Y intersection latches being in the reset condition. Thus through use of the interlock function, only one latch along a selected X row and Y column is set. The manual control unit 28 is configured so that when twice the number of clock signals required to access each X-Y intersection latch have occurred subsequent to depression of the interlock switch, the interlock signal will be removed thereby removing the "carry" signal from line 76.

Thus it should now be apparent that a control system for a solid state crossbar switch has been disclosed which can be time shared to accomplish a plurality of control functions.

What is claimed is:

1. A control system for a solid state crossbar switch having X rows, Y columns, and Z switching planes, each X-Y intersection including an intersection latch for simultaneously controlling corresponding latches in each of said Z switching planes, said system comprising:
   first means for continually and sequentially accessing each of said X-Y intersection latches;
   second means responsive to said first means for determining which of said intersection latches are in a set condition;
   third means responsive to said first means for ensuring that only one X-Y intersection latch in an X row and Y column defining a predetermined X-Y intersection latch is in a set condition; and
   fourth means responsive to said first means for resetting each of said X-Y intersection latches.

2. The control system of claim 1 wherein said X-Y intersections are divided into a predetermined number of X-Y intersection groups, each group having a predetermined address, said first means comprising:
   means for sequentially addressing each of said X-Y intersection groups containing X-Y intersection latches within a predetermined X row; and
   means for sequentially addressing each X-Y intersection latch within said predetermined X row contained within said addressed X-Y intersection group.

3. The control system of claim 2 wherein said second means comprises:
   means for sequentially providing an interrogation signal on first lines corresponding to each of said X rows, each of said first lines interconnecting each of said intersection latches in one of said X rows; and
   means for determining the presence of one or more read-out signals on one or more second lines, each of said second lines corresponding to one of said Y columns, said one or more read-out signals occurring in response to said interrogation signal on one of said first lines when one or more of said intersection latches connected to said first line containing said interrogation signal is in a set condition.

4. The control system of claim 2 further comprising fifth means for providing a set or reset signal on a set line connected to each of said X-Y intersection groups, said fourth means comprising:
   means for providing a reset signal on said set line; and
   means for providing said reset signal to each X-Y intersection latch as it is sequentially addressed.

5. The control system of claim 2 further comprising fifth means for providing a set or reset signal on a set line connected to each of said X-Y intersection groups, said third means comprising:
   means for providing a reset signal on said set line in response to an interlock signal;
   means for connecting said set line to each X-Y intersection latch in an X row and Y column defining said predetermined X-Y intersection latch;
   means for generating a "carry" signal in response to accessing at least all of said X-Y intersection latches after occurrence of said interlock signal; and
   means responsive to said "carry" signal for causing a set signal to appear on said set line when said predetermined X-Y intersection latch is addressed by said first means, thereby setting said predetermined X-Y intersection latch.

6. The control system of claim 5 wherein said means responsive to said "carry" signal comprises comparator means for generating a coincidence signal when said predetermined X-Y intersection latch to be set is addressed by said first means; and
   means responsive to said coincidence signal for generating said set signal.

* * * * *